UNITED STATES PATENT OFFICE.

MARK RUSH, OF ATLANTA, GEORGIA, ASSIGNOR OF ONE-THIRD HIS RIGHT TO LEWIS SCOFIELD, SR., AND LEWIS SCOFIELD, JR., OF SAME PLACE.

IMPROVEMENT IN THE MANUFACTURE OF STEEL.

Specification forming part of Letters Patent No. 156,596, dated November 3, 1874; application filed September 22, 1874.

*To all whom it may concern:*

Be it known that I, MARK RUSH, of the city of Atlanta, in the county of Fulton and State of Georgia, have invented certain Improvements in the Manufacture of Steel, of which the following is a specification:

The nature of my invention relates to a new and improved composition to be used in the manufacture of steel from ordinary cast-iron, as will be fully hereinafter set forth; and it consists in a combination of carbonate of ammonia and chloride of sodium in various proportions, according to the nature of the steel to be produced.

It is a well-known fact that it is necessary in the formation of steel to combine carbon in varying proportions with decarbonized iron; and it is further well known that the presence of nitrogen adds to the facility with which the steel is formed, and gives a product of great elasticity and tensile strength.

Heretofore the combination has been effected by heating wrought-iron in closed boxes with animal matter containing carbon and nitrogen, such as leather scraps or other equivalent or analogous material. This has been found objectionable, owing to the fact that it is very difficult to determine the definite proportions of the carbon and nitrogen in such compounds, and this renders it almost impossible to foretell the quality of the resultant steel.

My compound is designed to overcome this defect by substituting for the animal compound a mineral composition in which the proportions of carbon and nitrogen are definitely known. For this purpose I make use of carbonate of ammonia, a salt composed of carbon, oxygen, nitrogen, and hydrogen. This I combine with chloride of sodium, which performs the part of a flux, excluding the atmosphere from the mass of molten iron, and allowing the ammonial salt to have full effect during its decomposition.

In carrying out my invention, I employ the carbonate of ammonia in the proportion of one-half ounce to from five hundred to eight hundred pounds of the ordinary pig or cast iron, using the common salt in the proportion of one pound of such salt to the same proportion (five hundred to eight hundred pounds) of metal.

I use an ordinary puddling-furnace in the preparation of my improved steel, with any convenient charge of pig-iron, usually the common charge, varying from five hundred to eight hundred pounds. The iron is subjected to the ordinary process of puddling, and when fully melted, and nearly or wholly decarbonized, the mixture is introduced in the form of packages, which are thoroughly commingled with the metal by the operator by stirring and agitating with the ordinary tools.

In the formation of ordinary low steel, one package of the compound containing one-half ounce of carbonate of ammonia and one pound of chloride of sodium will be sufficient for the purpose, and the grade of hardness in the steel may be varied up to the very highest standard by employing additional packages, as may be desired.

I am aware that other ammoniacal compounds, such as chloride of ammonia, have been employed in combination with other substances in the manufacture of steel, but ammoniacal compounds containing the proper amount of carbon to carbonize the iron and convert it into steel have not to my knowledge been used. Sal ammoniac or chloride of ammonium, which has heretofore been used in the manufacture of steel, has proven inefficient, inasmuch as it contains no carbon and can supply no carbon to the metal, and only gives the nitrogen, which will only operate properly, as is well known to steel manufacturers, when employed in combination with some substance containing carbon.

Having thus fully described my invention, what I claim, and desire to secure by Letters Patent, is—

The compound for the manufacture of steel from decarbonized iron, consisting of carbonate of ammonia and common salt in about the proportions herein described.

In testimony that I claim the foregoing as my own I herewith affix my signature in presence of two witnesses.

MARK RUSH.

Witnesses:
F. R. BINGEN,
P. ROMARE.